US012686012B2

(12) United States Patent
Zöllig

(10) Patent No.: US 12,686,012 B2
(45) Date of Patent: Jul. 21, 2026

(54) STATOR PART OF AN IMPACT MILL AND ATTACHMENT METHOD

(71) Applicant: swissRTec AG, Altnau (CH)

(72) Inventor: Mario Zöllig, Kreuzlingen (CH)

(73) Assignee: swissRTec AG, Altnau (CH)

( * ) Notice: Subject to any disclaimer, the term of this patent is extended or adjusted under 35 U.S.C. 154(b) by 272 days.

(21) Appl. No.: 18/374,042

(22) Filed: Sep. 28, 2023

(65) Prior Publication Data

US 2024/0109074 A1 Apr. 4, 2024

(30) Foreign Application Priority Data

Sep. 29, 2022 (CH) .................................. 1123/2022

(51) Int. Cl.
*B02C 13/282* (2006.01)
*B02C 13/14* (2006.01)
*B02C 13/18* (2006.01)
*B02C 13/28* (2006.01)

(52) U.S. Cl.
CPC .................................. *B02C 13/282* (2013.01)

(58) Field of Classification Search
CPC ....... B02C 13/282; B02C 13/28; B02C 13/14; B02C 13/185; B02C 2013/1878; B02C 2013/2825
See application file for complete search history.

(56) References Cited

U.S. PATENT DOCUMENTS 3,545,691 A * 12/1970 Arsenault ............... B02C 13/28 241/197
4,142,687 A 3/1979 Potwin
7,744,028 B2 6/2010 Zollig
7,753,302 B2 7/2010 Zöllig
8,333,339 B2 * 12/2012 Pallmann ................ B02C 18/18 241/242
12,491,519 B2 12/2025 Zöllig
2009/0159732 A1 * 6/2009 Zollig .................. H02G 15/085 241/282.2
2009/0166457 A1 * 7/2009 Zollig ................... B02C 13/282 241/295
2024/0109073 A1 4/2024 Zöllig

FOREIGN PATENT DOCUMENTS

EP 1960108 B1 8/2008
EP 1960109 B1 8/2008

OTHER PUBLICATIONS

For U.S. Appl. No. 18/374,031: Interview Summary dated Aug. 21, 2025 Notice of Allowance dated Sep. 4, 2025.

* cited by examiner

*Primary Examiner* — Mohammed S. Alawadi
(74) *Attorney, Agent, or Firm* — Fleit Intellectual Property Law; Paul D. Bianco

(57) ABSTRACT

In a stator part of an impact mill, attached to an inner surface of an impact mill housing wall, includes a plurality of multifunctional stator tools, which are indirectly detachably attached to the impact mill housing wall, distributed along the inner surface, the arrangeability and replaceability of the stator tools is simplified, so as to increase user friendliness during impact mill operation. This is achieved by having the stator part comprise at least one spring element with spring element recesses. The at least one spring element is circumferentially attached along the inner circumference of the impact mill housing.

12 Claims, 2 Drawing Sheets

STATOR PART OF AN IMPACT MILL AND ATTACHMENT METHOD

FIELD OF THE INVENTION

The present invention describes a stator part of an impact mill, attached to an inner surface of an impact mill housing wall, comprising a plurality of multifunctional stator tools, which are indirectly detachably attached to the impact mill housing wall, distributed along the inner surface, wherein the stator tools spaced a defined distance apart from an opposing plurality of rotor tool blades of a rotatable rotor part inside of the impact mill housing are actively connected with the rotor tool blades, thereby forming a grinding chamber lying in between, as well as a method for detachably indirectly fastening a stator tool to an inner surface of an impact mill housing wall.

BACKGROUND

Impact mills or rotor mills have long been known, and are becoming increasingly important during the treatment of used materials for their recycling. Such impact mills are used for comminuting soft, medium-hard and fibrous, brittle materials. The applicant wanted to develop an impact mill that can also be specially used for the posttreatment and entanglement of anode and cathode material from Li-ion battery recycling. The input material is fed into the impact mill from above, and moved inside of an impact mill housing between a stator part and a rotor part. As the rotor part with its rotor tools rotates along the rigid stator part with correspondingly fixed stator tools, high impact forces act on the material, the adhering black mass is detached in the process, and the anode and cathode material is simultaneously comminuted, taking the form of spheres. The material is here pneumatically conveyed through the impact mill. Rotor parts usually range in diameter between one and two meters, the number of rotors ranges between 10 and 30, and rotor speeds of 40 to 100 m/s are reached, wherein rotors with counterclockwise and clockwise rotation are preferred. Several rotor parts 2 are preferably used in various planes, which can be offset mounted.

While simple impact mills known from prior art were able to comminute the material to be treated, the service life of stator tools during which work could be performed without interruption was short, and one is confronted with the constant renovation and overhaul of the stator tools. Reusable and replaceable stator tools are known from prior art, but replacement convenience is poor and time-consuming.

For example, EP1960109 of the applicant describes an impact mill which allows for the replacement of the stator tools in the form of tiles from outside of the grinding chamber or interior of the impact mill. The desire was to create an impact mill for lighter input materials, so that impact mill of EP1960109 is disadvantageous primarily for reasons of cost. However, it is not readily possible to easily use lighter components, and such a robust impact mill from EP1960109 would simply not be used for these lighter input materials, since such impact mills must be massive in design. The input materials cause a lot of wear. The selection of materials is limited, wherein casting delivers the best cost/benefit ratio. The construction must be massive, especially also because of impurities which are regularly introduced.

Finally, the user friendliness of known impact mills needs improvement, and the impact mill is anything but easy to maintain. Once a commercially available impact mill has been set up and made operational, high throughputs of recycling material can be achieved, but time is lost owing to the frequent replacement of stator tools. These disadvantages had to be eliminated, since there is today also a demand on the market for a robust and durable machine design that must also consider user friendliness.

SUMMARY OF THE INVENTION

The disadvantages of prior art described above are to be eliminated by the present device.

The present invention has set itself the task of optimizing a stator part of an impact mill, wherein the arrangeability and replaceability of the stator tools is simplified.

As a consequence, the optimized stator part results in an extreme reduction in the maintenance or replacement time, so that the downtime of the impact mill during maintenance is diminished by comparison to impact mills from prior art.

Variations of feature combinations or slight adjustments of the invention are contained in the detailed description, shown on the figures, and incorporated in the dependent claims.

BRIEF DESCRIPTION OF THE DRAWINGS

A preferred exemplary embodiment of the subject matter of the invention will be described below in conjunction with the attached drawings.

Additional features, details and advantages of the invention may be gleaned from the following description of preferred embodiments of the invention as well as the drawings. Shown on.

DETAILED DESCRIPTION

Figure 1:
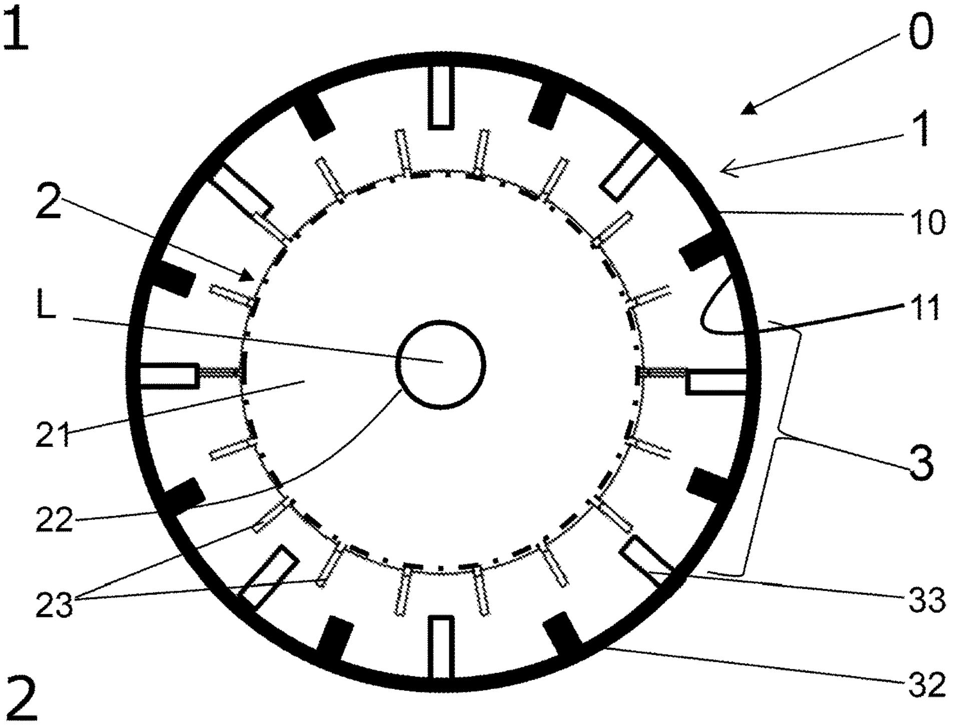
FIG. 1 is a schematic view in an open impact mill housing, wherein a rotatably, concentrically mounted rotor part and a fixed stator part are visible.

FIG. 1 shows an impact mill 0 with an impact mill housing 1, comprising an impact mill housing wall 10 with an inner surface 11, a rotor part 2 with a blade attachment plate 21, rotor part attachment sleeve 22, and a plurality of rotor tool blades 23, as well as a stator part 3.

This is the basic configuration of such an impact mill 0. Components necessary for operating the impact mill 0, such as a drive unit with at least one motor and electronics for controlling and monitoring the impact mill 0, are not shown here and described in any more detail, since these components are known to the expert. The shape of a drive shaft, mounting of the drive shaft, number of rotor parts 2 and detailed design of the rotor parts 2 are of no further interest for the inventive idea, and can be designed in different versions. It is critical to ensure a sufficiently stable attachment of the rotor tool blade 23 at an identical distance from the center of the blade attachment plate 21 or longitudinal axis L on the blade attachment plate 21 at a constant distance to the stator part 3 attached on the inner surfaces 11 of the impact mill housing wall 10.

Figure 2:
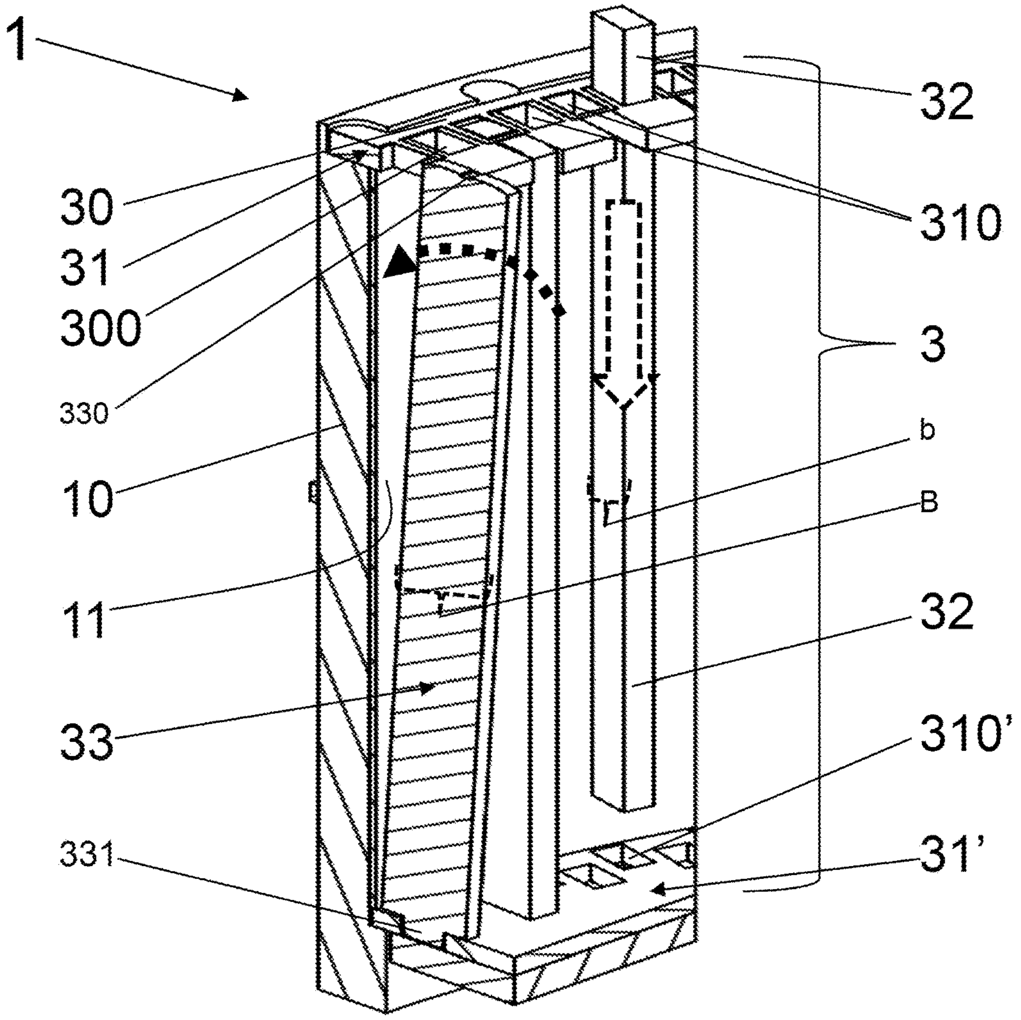
FIG. 2 is a partial longitudinal section through a portion of an impact mill housing wall with stator tools partially introduced into a spring element and a retaining plate.

As first evident pursuant to FIG. 2, the stator part 3 here has an improved design, comprising at least one spring element 30, preferably several spring elements 30, attached at least along the circumference of the inner surface 11. The at least one spring element 30 is sufficiently flexibly bendable, in particular manufactured out of sheet metal.

An upper retaining plate 31 is arranged on an upper side of the stator part 3, and designed as an annular plate with a plurality of stator tool recesses 310. Varyingly wide stator tools 32, 33 can be partially threaded into these stator tool recesses 310 in the upper retaining plate 31.

The spring elements 30 are attached in the edge area of the upper side of the impact mill housing 1 along the upper circumference. For example, the spring elements 30 are here placed on the upper retaining plate 31, and there attached. The at least one spring element 30 or the plurality of spring elements 30 is/are preferably adhesively bonded to or on the upper retaining plate 31. Attachment can take place on the inner surfaces 11 of the impact mill housing wall 10 or on the upper retaining plate 31. The spring elements 30 have spring element recesses 300 varying in size, in which narrow stator tools 32 and wide stator tools 33 are mounted, in part actively connected. The at least one or the several spring elements 30 along the circumference of the impact mill housing wall 10 hold the stator tools 32, 33 in position, but are easy to install and remove.

As soon as a cover is placed on the stator part 3 of the impact mill 0 or the impact mill housing wall 10, the stator tools 32, 33 remain immovably fixed in place during operation. A wear plate is usually formed or attached on the cover, and closes the gap between the rotor part 2 and stator part 3. The wear plate is designed in such a way as to face toward the interior in the mounted state.

A lower retaining plate 31' is arranged, preferably irremovably attached, in the area of the floor of the impact mill housing 1, opposite the upper side and the upper retaining plate 31. Stator tool recesses 310' adjusted to the narrow stator tools 32 and wide stator tools 33 are also cut into the lower retaining plate 31'.

Both types of stator tools 32, 33 can be detachably attached to the impact mill housing wall 10 by means of a spring element 30, upper retaining plate 31 and lower retaining plate 31', and can be individually replaced easily and quickly without the use of tools. As a whole, a gravity-assisted clamped connection is achieved between the stator tools 32, 33.

The narrow stator tools 32 are introduced into and passed through the stator tool recesses 310 in the upper retaining plate 31 provided for this purpose and the spring element recesses 300. With the impact mill housing 1 closed, the aforementioned cover prevents an upward sliding.

The narrow stator tools 32 are here designed with a constant width b throughout, and can be linearly inserted from the upper side of the impact mill housing 1 through the spring element recesses 300 in the spring element 30 and the stator tool recesses 310. As denoted by the dashed arrow on FIG. 2, the narrow stator tools 32 can be inserted until their bottom tips are inserted so as to partially submerge into the stator tool recesses 310' provided for this purpose. Once completely inserted, the stator tools 32 detachably positively attached in the stator tool recesses 310, 310' are held against the impact mill housing wall 10. A grinding chamber is formed between the stator tools 32, 33 and the rotatable rotor tool blades 23, in which recycling material to be separated is separated, wherein defined distances exist between the stator tool tips and the tips of the rotor tool blades 23.

If wide stator tools 33 are used, they predominately have a width B that is greater than the width b of the narrow stator tools 32. The spring elements 30 are inserted so as to detachably attach wide stator tools 33 and secure them against inadvertently tilting out during assembly of the stator tools 33 after removing the cover from the impact mill 1. On the wide stator tools 33, a transverse groove 330 is arranged on the stator tool upper side, and an end pin 331, a partial tapering of the wide stator tool 33, is arranged on the stator tool lower side. For purposes of attaching the wide stator tool 33, the stator tool lower side with its end pin 331 is introduced into the desired stator tool recess 310' in the lower retaining plate 31', and the stator tool 33 is upwardly swiveled with the stator tool upper side in the direction of the spring element 30, as denoted with the dashed arrow. If the stator tool 33 has been perpendicularly swiveled, the spring element 30 in the area of the spring element recess 300 can engage into the transverse groove 330 of the stator tool 33. As a result, the wide stator tool 33 is interchangeably held on the upper side of the impact mill housing 1 by the spring element 30. This process is repeated for all wide stator tools 33.

The spring elements 30 are to be regarded as a mounting aid, wherein the stable attachment takes place by putting on the cover of the impact mill 0, preferably with a wear plate, and the cover closes the open surface.

As shown on FIG. 2, the stator tool recesses 310, 310' can be varyingly offset on the upper and lower retaining plate 31, 31' toward the center of the retaining plate 31, 31'.

Figure 3:
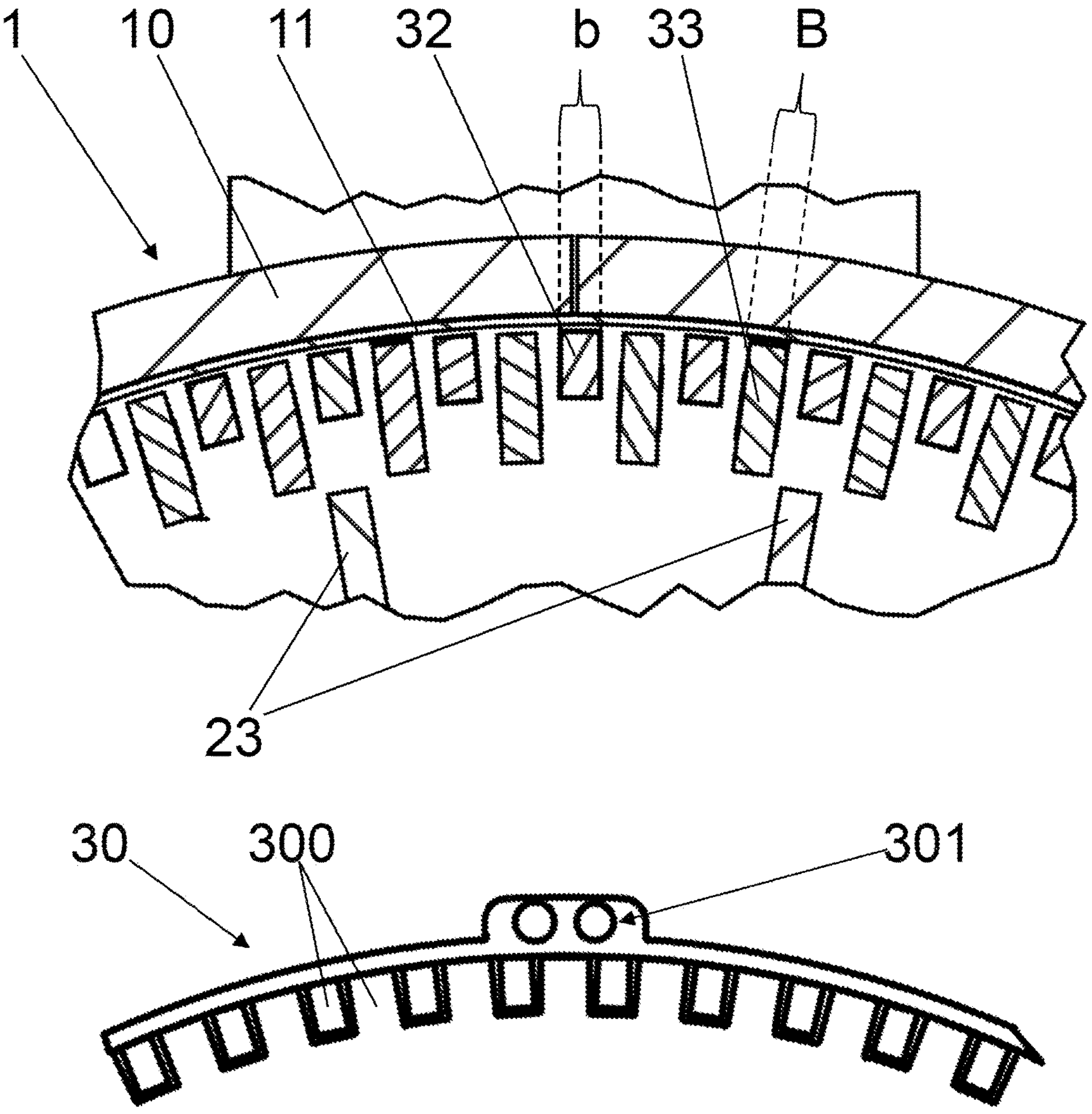
FIG. 3 is a partial, schematic section through an edge area of the impact mill housing with depicted rotor tool blades and varyingly wide stator tools and the spring element.

As evident once again from FIG. 3, stator tools 32, 33 varying in width are here designed with different widths b, B, which can be actively connected with the spring element 30, the upper retaining plate 31 and the lower retaining plate 31' and are held, wherein the spring element 30 performs an auxiliary holding task.

It is possible to use stator tools 32, 33 varying in width, especially preferably each with an alternating width, as shown here, so that directly adjacent stator tools 32, 33 have different widths.

However, respective stator tools 32, 33 with the same width can also be used, along with correspondingly adjusted spring elements 30 and retaining plates 31, 31' or correspondingly offset stator tool recesses 310, 310', so as to achieve an interlocking connection.

The plurality of spring elements 30 can be attached to the upper side of the impact mill housing 1 along the inner surface 11 of the impact mill housing 10 by spring element attachment means 301, wherein it is preferred that the spring elements 30 be screwed, and that at least four spring elements 30 be used. The spring element 30 has a one-piece design, and is curved according to the circumferential line of the inner surface 11 of the impact mill housing wall 10. Attachment recesses are arranged in the area of the center of the spring element 30, in which the attachment means 301 can be attached. In order to attach and partially thread the stator tools 32, 33, the spring element 30 has to have a resilient elastic effect. The individual spring element recesses 300, 300 must be tailored to the width of the stator tools 32, 33 or to the transverse groove 330 of the wide stator tools 33.

FIG. 3 shows the spring element 30, wherein no stator tools 32 are shown.

Using the spring elements 30 with the spring element recesses 300, the upper retaining plate 31 with stator tool recesses 310 and the rear retaining plate 31' with stator tool recesses 310' makes it possible to achieve a simple and quick assembly of the stator tools 32, 33.

Replacement:

As a whole, the stator part 3 with all of its stator tools 32, 33 is rigidly fixed in the impact mill housing 1, and the distance to the rotatable rotor tool blades 23 on the blade attachment plate 21 is defined. If the stator tools 32, 33 wear after prolonged operation, stator tools 32, 33 can be replaced individually, easily, and quickly.

However, spring elements 30 along with inserted or swiveled stator tools 32, 33 could also be replaced, wherein the lower sides of the stator tools 32, 33 must be pulled out of the stator tool recesses 310' in the lower retaining plate 31', and each spring element 30 can be removed after detaching the spring element attachment means 301 along with the inserted or swiveled stator tools 32, 33.

However, the spring elements 30 or the at least one spring element 30 is flexible enough to be easily lifted up, so that the wide stator tool 33 can be easily dismantled.

The retaining plate 31 is preferably formed on the floor of the impact mill housing 1 as an annular plate with a central recess, through which portions of the rotor part 2 or the drive can be guided.

In order to attach the spring elements 30, a circumferential groove running along the inner surface 11 of the impact mill housing wall 10 can be cut out, into which the spring elements 30 can be partially introduced and attached therein.

A completely circumferential spring element 30 could optionally also be used.

REFERENCE LIST

0 Impact mill
1 Impact mill housing
10 Impact mill housing wall
11 Inner surface
2 Rotor part
21 Blade attachment plate
22 Rotor part attachment sleeve
23 Rotor tool blade
3 Stator part (rigid in impact mill housing)
30 Spring element (replaceable)
300 Spring element recesses (introduction of 32, 33)
301 Spring element attachment means (attachment to inner surface)
31 Retaining plate (upper, rigidly fixed, annular plate)
310 Stator tool recess
31' Retaining plate (lower, rigidly fixed, can be an annular plate)
310' Stator tool recess
32 Stator tool, narrow (insertable, replaceable)
b Width
33 Stator tool, wide (swivelable, replaceable)
B Width
330 Transverse groove (for latching in the spring element recess)
331 End pin

The invention claimed is:

1. An impact mill including a stator part attached to an inner surface of an impact mill housing wall, the stator part comprising a plurality of multifunctional stator tools, which are indirectly detachably attached to the impact mill housing wall, distributed along the inner surface, wherein the stator tools are spaced a defined distance apart from an opposing plurality of rotor tool blades of a rotatable rotor part inside of the impact mill housing and are operatively connected with the rotor tool blades, thereby forming a grinding chamber therebetween, wherein the stator part comprises at least one spring element with spring element recesses, wherein the at least one spring element is circumferentially attached along an inner circumference of the impact mill housing, and wherein the stator part has an upper retaining plate designed as an annular plate with a plurality of stator tool recesses facing the at least one spring element and a lower retaining plate on a side lying opposite the at least one spring element inside of the impact mill housing with a plurality of stator tool recesses, so that stator tools in the spring element recesses of the at least one spring element and the stator tool recesses in the upper retaining plate and lower retaining plate are kept detachably and replaceably stored inside of the impact mill housing.

2. The impact mill according to claim 1, wherein the at least one spring element is attached to the inner surface of the impact mill housing wall with a spring element attachment, or the at least one spring element is adhesively bonded to the upper retaining plate.

3. The impact mill according to claim 2, wherein the spring element recesses comprise recesses of different sizes for receiving stator tools that differ in width.

4. The impact mill according to claim 2, wherein the stator tools have a continuous width and are partially passed through the spring element recesses, and stator tool ends are introduced and held in the stator tool recesses of the upper retaining plate and the lower retaining plate.

5. The impact mill according to claim 1, wherein at least one of the plurality of stator tools has a transverse groove at a first end for engaging into at least one of the spring element recesses, a width in a central section, and an end pin at a second end for engaging into at least one of the stator tool recesses in the lower retaining plate, so that the at least one stator tool is swiveled into the at least one spring element recess.

6. The impact mill according to claim 1, wherein the plurality of stator tools comprises narrow stator tools and wide stator tools alternatingly introduced into the at least one spring element with correspondingly alternatingly varying spring element recesses, which on a side opposite the spring element are held in the stator tool recesses in the lower retaining plate.

7. The impact mill according to claim 1, wherein the spring element recesses comprise adjacent spring element recesses varying in shape so as to receive stator tools varying in width.

8. The impact mill according to claim 1, wherein the at least one spring element comprises at least four spring elements attached along a circumference of the inner surface.

9. The impact mill according to claim 1, wherein the at least one spring element has a one-piece design, is curved according to a circumferential line of the inner surface, and has attachment recesses to receive means for attaching the at least one spring element to the inner surface.

10. The impact mill according to claim 1, wherein the lower retaining plate is attached to a floor of the impact mill housing, and designed as an annular plate with a central recess.

11. The impact mill according to claim 1, wherein the at least one spring element is adhesively bonded or soldered to or on the upper retaining plate.

12. The impact mill according to claim 1, wherein the stator part has a cover with an integrally molded or attached wear plate, wherein the wear plate faces an interior of the stator part in a mounted state of the cover.

* * * * *